US012780002B2

(12) United States Patent
Dharavath et al.

(10) Patent No.: US 12,780,002 B2
(45) Date of Patent: Nov. 3, 2026

(54) POWER SYSTEM AND METHOD FOR OPTIMIZING POWER SUPPLY TO AN ELECTRIFIED TRANSPORTATION REFRIGERATION UNIT (E-TRU)

(71) Applicant: Carrier Corporation, Palm Beach Gardens, FL (US)

(72) Inventors: Anjaneyulu Dharavath, Hyderabad (IN); Venkata Satya Sai Ramesh Kumar Junnuri, Hyderabad (IN)

(73) Assignee: CARRIER CORPORATION, Palm Beach Gardens, FL (US)

(*) Notice: Subject to any disclaimer, the term of this patent is extended or adjusted under 35 U.S.C. 154(b) by 15 days.

(21) Appl. No.: 18/987,153

(22) Filed: Dec. 19, 2024

(65) Prior Publication Data

US 2025/0214442 A1 Jul. 3, 2025

Related U.S. Application Data

(60) Provisional application No. 63/616,989, filed on Jan. 2, 2024.

(51) Int. Cl.
*B60L 1/00* (2006.01)
*B60H 1/00* (2006.01)
(Continued)

(52) U.S. Cl.
CPC .......... *B60L 1/003* (2013.01); *B60H 1/00428* (2013.01); *H02J 7/1415* (2013.01); (Continued)

(58) Field of Classification Search
CPC .. B60L 1/003; B60L 2200/36; B60L 2240/62; B60L 2260/52; H02J 7/82; H02J 7/1415; H02J 7/1446; B60H 1/00428
See application file for complete search history.

(56) References Cited

U.S. PATENT DOCUMENTS

| | | | |
|---|---|---|---|
| 9,815,373 | B2 | 11/2017 | Perkins |
| 10,295,355 | B2 | 5/2019 | Baglino et al. |

(Continued)

FOREIGN PATENT DOCUMENTS

| | | | |
|---|---|---|---|
| JP | 2003324853 | A | 11/2003 |
| JP | 2019202559 | A | 11/2019 |
| KR | 10-2008-0053561 | A | 6/2008 |

OTHER PUBLICATIONS

Extended European Search Report received for EP Application No. 24220809.8, mailed on May 28, 2025, 10 Pages.

*Primary Examiner* — Arslan Azhar
(74) *Attorney, Agent, or Firm* — Souad Hakim

(57) ABSTRACT

A power system for optimizing power supply to an Electrified Transportation Refrigeration Unit (E-TRU) of an electric vehicle includes an energy storage unit for supplying power to the E-TRU, an axle generator adapted to supply power to the energy storage unit and the E-TRU, and a charge management system. The charge management system monitors a State of Charge (SoC) of the energy storage unit. The charge management system accesses route information associated with the electric vehicle. Next, the charge management system predicts a power requirement of the electric vehicle and the E-TRU based on the accessed route information and controls the axle generator in an engaged mode or a disengaged mode based on the monitored SoC and the predicted power requirement of the electric vehicle and the E-TRU.

20 Claims, 3 Drawing Sheets

(51) Int. Cl.
*H02J 7/14* (2006.01)
*H02J 7/82* (2026.01)

(52) U.S. Cl.
CPC .............. *H02J 7/1446* (2013.01); *H02J 7/82* (2026.01); *B60L 2200/36* (2013.01); *B60L 2240/62* (2013.01); *B60L 2260/52* (2013.01)

(56) References Cited

U.S. PATENT DOCUMENTS

| | | | | |
|---|---|---|---|---|
| 10,315,495 | B2 | 6/2019 | Vehr et al. | |
| 10,353,410 | B2 | 7/2019 | Bates et al. | |
| 11,085,782 | B2 | 8/2021 | Adetola et al. | |
| 2016/0318421 | A1 | 11/2016 | Healy | |
| 2016/0363456 | A1 | 12/2016 | Pujos et al. | |
| 2020/0141746 | A1 | 5/2020 | Srnec et al. | |
| 2021/0213805 | A1 | 7/2021 | Saroka et al. | |
| 2021/0260964 | A1 | 8/2021 | Saroka et al. | |
| 2021/0268865 | A1 | 9/2021 | Saroka et al. | |
| 2022/0314738 | A1 | 10/2022 | Beaufrere et al. | |
| 2023/0029389 | A1* | 1/2023 | Bennett | B60L 58/12 |
| 2023/0174008 | A1* | 6/2023 | Lowe | B60H 1/3232<br>62/236 |
| 2023/0243314 | A1 | 8/2023 | Ducher et al. | |
| 2023/0278392 | A1 | 9/2023 | Makwinski | |
| 2024/0042824 | A1* | 2/2024 | Iglizn | B60H 1/00428 |
| 2024/0059235 | A1* | 2/2024 | Augenstein | B60R 16/03 |

* cited by examiner

POWER SYSTEM AND METHOD FOR OPTIMIZING POWER SUPPLY TO AN ELECTRIFIED TRANSPORTATION REFRIGERATION UNIT (E-TRU)

CROSS REFERENCE TO RELATED APPLICATION

This application claims the benefit of U.S. Provisional Patent Application No. 63/616,989 filed on Jan. 2, 2024, which is incorporated by reference herein in its entirety.

FIELD OF THE INVENTION

The disclosure relates to electric vehicles having an Electrified Transport Refrigeration Unit (E-TRU), and more specifically to a power system for such an electric vehicle and a method for optimizing power supply to the E-TRU of the electric vehicle.

BACKGROUND

Vehicles, such as Light Commercial Vehicles (LCVs) or Heavy Commercial Vehicles, are generally deployed for transporting cargo via sea, rail, or road networks. Such vehicles usually include a cargo container for storing cargo to be transported. To maintain the quality of the goods in the cargo container, a refrigeration unit may be deployed to such cargo container of the vehicle. Typically, the refrigeration unit provides desired environmental parameters, such as temperature, pressure, humidity, and other conditions to the cargo container. Such refrigeration unit is either powered by an electric power source, a fuel-based power source, or a combination thereof. Further, the fuel-based power source is usually also used to charge the electric power source and power the refrigeration unit.

Currently, the fuel-based power source charges the electric power source to keep the SoC thereof close or equal to 100%. For instance, whenever the SoC of the electric power source drops below 100%, the fuel-based power source is used to maintain the SoC at 100%. Therefore, such a charging strategy results in limited utilization of the electric power source or green energy from the electric power source to supply power to the refrigeration unit. Also, charging the electric power source whenever the SoC drops below 100% may increase the overall fuel consumption and might be undesirable from the perspective of fuel emissions.

Therefore, it is desirable to provide a system and a method that may allow the electric power source to discharge to maximize the usage of green energy from such source.

SUMMARY

This summary is provided to introduce a selection of concepts, in a simplified format, that are further described in the detailed description of the invention. This summary is neither intended to identify key or essential inventive concepts of the invention and nor is it intended for determining the scope of the invention.

A power system for optimizing power supply to an Electrified Transportation Refrigeration Unit (E-TRU) of an electric vehicle includes an energy storage unit, an axle generator, and a charge management system. The energy storage unit is configured to supply power to the E-TRU. Moreover, the axle generator, in communication with the energy storage unit, is adapted to supply power to at least one of the energy storage unit and the E-TRU. The charge management system is in communication with the E-TRU, the energy storage unit, and the axle generator. The charge management system is configured to monitor a State of Charge (SOC) of the energy storage unit. Next, the charge management system accesses route information associated with the electric vehicle. The route information includes at least one of information retrieved from a Geographical Information System (GIS), information associated with driver behavior, and information retrieved from a sensing system associated with the electric vehicle. Then, the charge management system predicts a power requirement of at least the E-TRU based on the accessed route information. Finally, the charge management system controls the axle generator in at least one of an engaged mode and a disengaged mode based on the monitored SoC and the predicted power requirement of at least the E-TRU.

In one or more embodiments according to the disclosure, controlling the axle generator includes determining whether the monitored SOC is greater than a configurable threshold level and controlling the axle generator in the disengaged mode if the monitored SOC is determined to be greater than the configurable threshold level.

In one or more embodiments according to the disclosure, in the disengaged mode, the power requirement of the electric vehicle and the E-TRU are supplied by the energy storage unit.

In one or more embodiments according to the disclosure, controlling the axle generator includes determining whether the monitored SOC equals a configurable threshold level and controlling the axle generator in the engaged mode if the monitored SOC is determined to be equal to or lower than the configurable threshold level.

In one or more embodiments according to the disclosure, in the engaged mode, the power requirement of the electric vehicle and the E-TRU are supplied by the axle generator.

In one or more embodiments according to the disclosure, in the engaged mode, the charge management system is further configured to analyze the route information to determine a distance between a current location and a destination of the electric vehicle. Next, the charge management system predicts the power generated by the axle generator based on the determined distance and the route information. Finally, the charge management system controls the axle generator to supply power to charge the energy storage unit if the predicted power generated by the axle generator exceeds the power for charging the energy storage unit.

In one or more embodiments according to the disclosure, the charge management system comprises a battery management controller and an E-TRU controller in communication with each other and an electronic drive controller configured to control the axle generator.

In one or more embodiments according to the disclosure, the information retrieved from the sensing system comprises information associated with detection of at least one of an acceleration condition, a de-acceleration condition, a coasting condition, and a braking condition, and an idling condition of the electric vehicle.

In one or more embodiments according to the disclosure, the information associated with driver behavior is stored for different driver profiles in a memory unit.

In one or more embodiments according to the disclosure, the information associated with driver behavior is modified based on the information retrieved from the sensing system.

A method for optimizing power supply to an Electrified Transportation Refrigeration Unit (E-TRU) of an electric vehicle, is also disclosed herein. The method includes monitoring, via a charge management system, a State of Charge (SOC) of an energy storage unit. Next, the method includes accessing, via the charge management system, route information associated with the electric vehicle, the route information comprising at least one of information retrieved from a Geographical Information System (GIS), information associated with driver behavior, and information retrieved from a sensing system associated with the electric vehicle. Then, the method includes predicting, via the charge management system, a power requirement of at least the E-TRU based on the accessed route information. Finally, the method includes the step of controlling, via the charge management system, the axle generator in at least one of an engaged mode and a disengaged mode based on the monitored SOC and the predicted power requirement of at least the E-TRU.

In one or more embodiments according to the disclosure, controlling the axle generator includes determining whether the monitored SOC is greater than a configurable threshold level and controlling the axle generator in the disengaged mode if the monitored SOC is determined to be greater than the configurable threshold level.

In one or more embodiments according to the disclosure, in the disengaged mode, the power requirement of the electric vehicle and the E-TRU are supplied by the energy storage unit.

In one or more embodiments according to the disclosure, controlling the axle generator includes determining whether the monitored SOC equals a configurable threshold level and controlling the axle generator in the engaged mode if the monitored SOC is determined to be equal to or lower than the configurable threshold level.

In one or more embodiments according to the disclosure, in the engaged mode, the power requirement of the electric vehicle and the E-TRU are supplied by the axle generator.

In one or more embodiments according to the disclosure, in the engaged mode, the charge management system is further configured to analyse the route information to determine a distance between a current location and a destination of the electric vehicle. Next, the charge management system predicts the power generated by the axle generator based on the determined distance and the route information. Finally, the charge management system controls the axle generator to supply power to charge the energy storage unit if the predicted power generated by the axle generator exceeds the power for charging the energy storage unit.

In one or more embodiments according to the disclosure, the charge management system includes a battery management controller and a E-TRU controller in communication with each other and an electronic drive controller configured to control the axle generator.

In one or more embodiments according to the disclosure, the information retrieved from the sensing system comprises information associated with detection of at least one of an acceleration condition, a de-acceleration condition, a coasting condition, and a braking condition, and an idling condition of the electric vehicle.

In one or more embodiments according to the disclosure, the information associated with driver behavior is stored for different driver profiles in a memory unit.

In one or more embodiments according to the disclosure, the information associated with driver behaviour is modified based on the information retrieved from the sensing system.

To further clarify the advantages and features of the methods, systems, and apparatuses/devices, a more particular description of the methods, systems, and apparatuses/devices will be rendered by reference to specific embodiments thereof, which are illustrated in the appended drawings. It is appreciated that these drawings depict only typical embodiments of the disclosure and are therefore not to be considered limiting of its scope. The disclosure will be described and explained with additional specificity and detail with the accompanying drawings.

BRIEF DESCRIPTION OF THE DRAWINGS

These and other features, aspects, and advantages of the invention will become better understood when the following detailed description is read with reference to the accompanying drawings in which like characters represent like parts throughout the drawings, wherein.

Figure 1A:
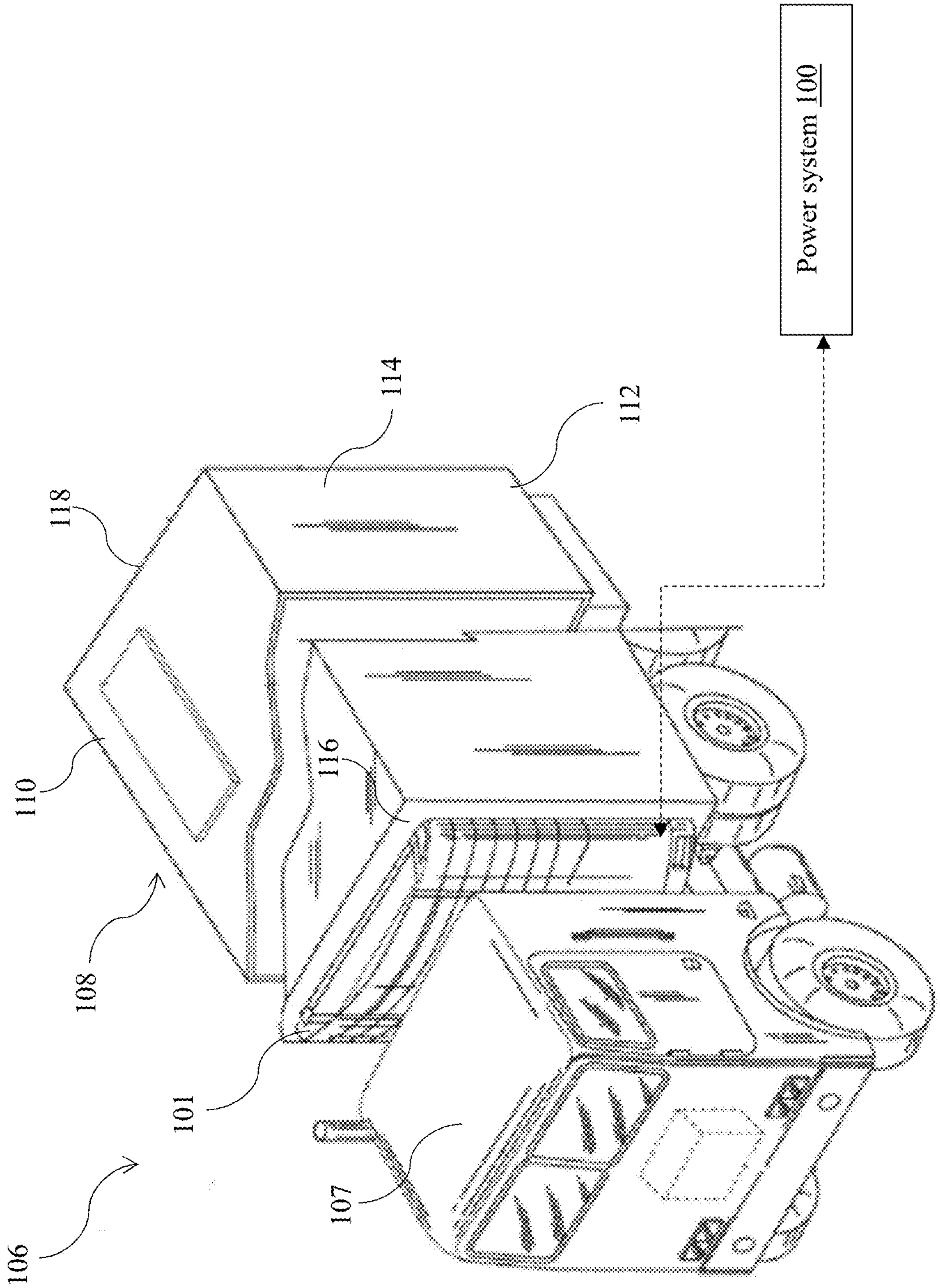
FIG. 1A illustrates a perspective view of an electric vehicle having an Electrified Transport Refrigeration Unit (E-TRU), according to one or more embodiments of the disclosure.

Further, skilled artisans will appreciate that elements in the drawings are illustrated for simplicity and may not have necessarily been drawn to scale. For example, the flow charts illustrate the method in terms of the most prominent steps involved to help to improve understanding of aspects of the disclosure. Furthermore, in terms of the construction of the device, one or more components of the device may have been represented in the drawings by conventional symbols, and the drawings may show only those specific details that are pertinent to understanding the embodiments of the disclosure so as not to obscure the drawings with details that will be readily apparent to those of ordinary skill in the art having the benefit of the description herein.

DETAILED DESCRIPTION OF FIGURES

For the purpose of promoting an understanding of the principles of the disclosure, reference will now be made to the various embodiments and specific language will be used to describe the same. It will nevertheless be understood that no limitation of the scope of the disclosure is thereby intended, such alterations and further modifications in the illustrated system and device, and such further applications of the principles of the disclosure as illustrated therein being contemplated as would normally occur to one skilled in the art to which the disclosure relates.

It will be understood by those skilled in the art that the foregoing general description and the following detailed description are explanatory of the disclosure and are not intended to be restrictive thereof.

Reference throughout this specification to "an aspect", "another aspect" or similar language means that a particular feature, structure, or characteristic described in connection with the embodiment is included in at least one embodiment of the disclosure. Thus, appearances of the phrase "in an embodiment", "in another embodiment", "some embodiments", "one or more embodiments" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The term "unit" used herein may imply a unit including, for example, one of hardware, software, and firmware or a combination of two or more of them. The "unit" may be interchangeably used with a term such as logic, a logical block, a component, a circuit, and the like. The "unit" may be a minimum system component for performing one or more functions or may be a part thereof.

Embodiments of the disclosure will be described below in detail with reference to the accompanying drawings.

Conventionally, vehicles with a Transport Refrigeration Unit (TRU), are usually diesel engine powered. However, less efficiency, higher noise, and non-zero emissions associated are the primary drivers for exploring new avenues for powering TRUs. In this regard, the electrified E-TRUs 101, disclosed herein, are powered using fuel-cell (FC)-battery hybrid systems that are a better alternative. However, for controlling the degree of hybridization which is defined as the fuel-cell generated power to the total E-TRU/load power, an optimized power management strategy (PMS) is desired. The disclosure provides a power system and a method for managing power supplied to the E-TRU 101 of an electric vehicle 106. The power system 100, disclosed herein, for managing power supplied to the E-TRU 101 proposes an improved power management strategy that predicts the load or power requirement of the E-TRU 101 based on route information of a selected route and accordingly selectively controls an energy storage unit 102 or an axle generator 103 to supply power to the E-TRU 101 thereby ensuring optimal energy utilization of the energy storage unit 102 throughout the selected route. Moreover, the proposed power management strategy ensures the battery serves as a power assist to the axle generator 103 and vice versa.

One of the major challenges with standalone energy storage unit 102, for example, a fuel-cell as a power source is slow dynamic response time dominated by parasitic loads and operating temperature. As a result, during fast load transients the fuel-cell voltage drops sharply which may lead to the failure or shutdown of the E-TRU 101. Also, frequent fuel-cell voltage drops lower the cell voltage and degrades the performance of the fuel-cell. Thus, for utilizing fuel-cell in applications where load dynamically changes, the power generated by the axle generator 103 is supplemented along with the power supplied by the energy storage unit 102. The proposed control architecture of the power system 100 is shown in FIGS. 1A-1B.

Figure 1B:
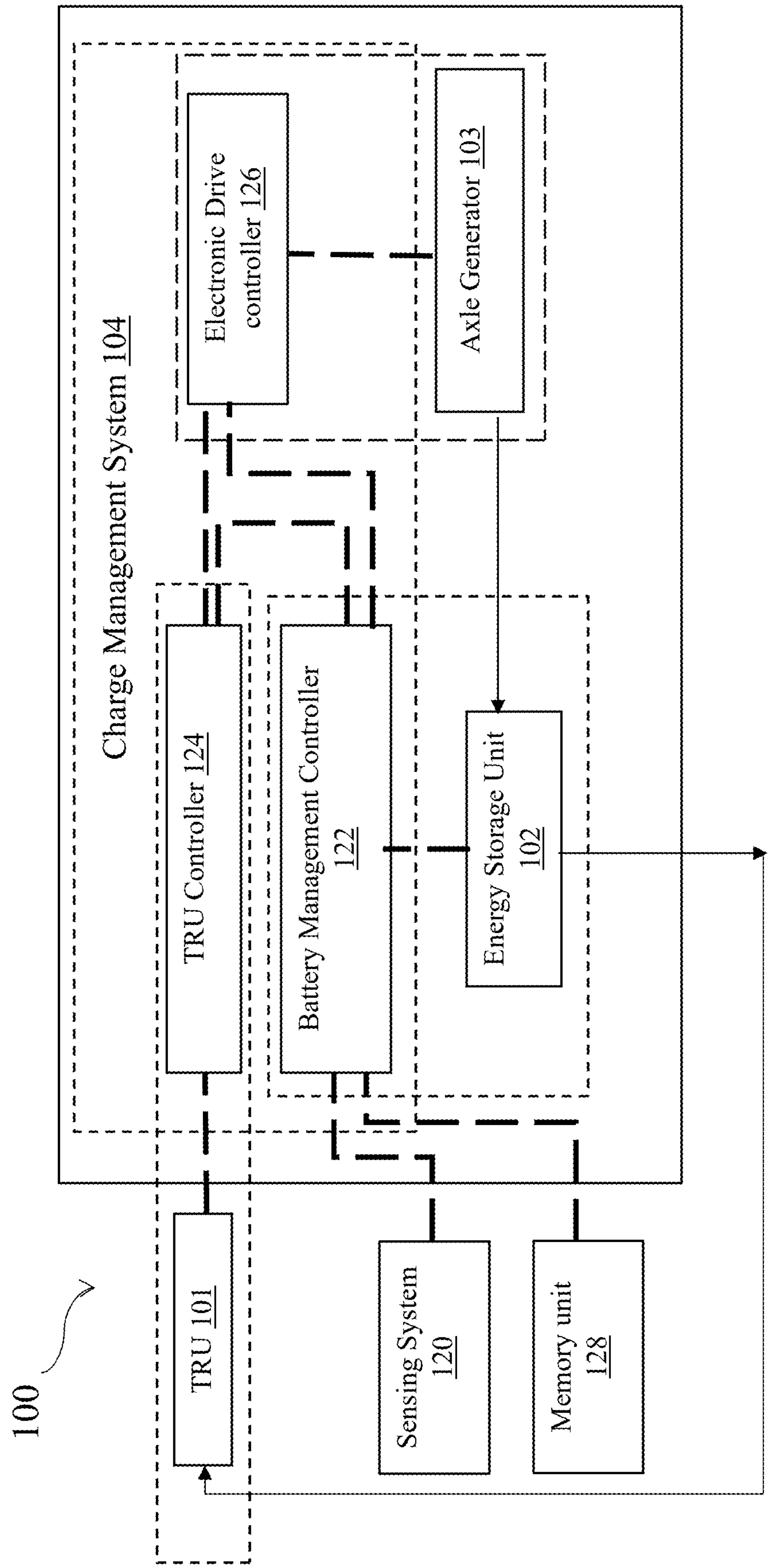
FIG. 1B illustrates a block diagram of a power system deployed in the electric vehicle, according to one or more embodiments of the disclosure.

FIG. 1A illustrates a perspective view of the electric vehicle 106 having the Electrified Transport Refrigeration Unit (E-TRU) 101, according to one or more embodiments of the disclosure. In one embodiment, the electric vehicle 106 may be embodied as a fuel-cell based electric vehicle 106 which may be part of a powertrain or a drive system of such electric vehicle 106. In another embodiment, the electric vehicle 106 may be embodied as an electric vehicle 106 having electric motors to provide propulsive force for traversing such electric vehicle 106. In yet another embodiment, the electric vehicle 106 may be embodied as a hybrid vehicle having a combination of a fuel-cell and one or more electric motors.

Referring to FIG. 1A, the electric vehicle 106 may include an operator's cabin 107, a container 108, the E-TRU 101, and the power system 100. The operator's cabin 107 may be located at a front of the electric vehicle 106 and coupled to the container 108. In an embodiment, the container 108 may be pulled by the electric vehicle 106. It is understood that embodiments described herein may be applied to shipping containers that are shipped by rail, sea, air, or any other suitable container, thus the electric vehicle 106 may be a truck, train, boat, airplane, helicopter, etc. The container 108 may be coupled to the electric vehicle 106 and is thus pulled or propelled to desired destinations.

In an embodiment, the container 108 may include a top wall 110, a bottom wall 112 opposed to and spaced from the top wall 110, a pair of side walls 114 spaced from and opposed to one another, and front and rear walls 116, 118 spaced from and opposed to one another. The front wall 116 may be closest to the electric vehicle 106. The container 108 may further include doors (not shown) at the rear wall 118, or any other wall. The walls 110, 112, 114, 116, 118 may together define the boundaries of a cargo compartment within the container 108.

The electric vehicle 106 may be used to transport and distribute cargo, such as perishable goods and environmentally sensitive goods, herein referred to as perishable goods. The perishable goods may include, but are not limited to, fruits, vegetables, grains, beans, nuts, eggs, dairy, seed, flowers, meat, poultry, fish, ice, blood, pharmaceuticals, and any other suitable cargo requiring cold chain transport.

In the illustrated embodiment, the E-TRU 101 may be coupled to the container 108 and positioned on the front wall 116 of the container 108. The E-TRU 101 may be adapted to provide desired environmental parameters, such as temperature, pressure, humidity, carbon dioxide, ethylene, ozone, light exposure, vibration exposure, and other conditions to the cargo compartment of the container 108. In one or more embodiments, the E-TRU 101 may be embodied as a refrigeration system capable of providing a desired temperature range and a humidity range.

In an embodiment, the E-TRU 101 may include, but is not limited to, a compressor, an electric compressor motor, a condenser that may be air cooled, a condenser fan assembly, a receiver, a filter dryer, a heat exchanger, an expansion valve, an evaporator, an evaporator fan assembly, a suction modulation valve, and controller that may include a computer-based processor (e.g., microprocessor). Referring to FIG. 1, the E-TRU 101 may be in communication with the power system 100 of the electric vehicle 106. The power system 100 may be configured to supply power for operating the E-TRU 101 or at least the subcomponents of the E-TRU 101.

FIG. 1B illustrates a block diagram of the power system 100 deployed in the electric vehicle 106, according to one or more embodiments of the disclosure.

The power system 100 for optimizing power supply to the Electrified Transportation Refrigeration Unit (E-TRU) 101 of the electric vehicle 106 includes the energy storage unit 102, the axle generator 103, and a charge management system 104. The energy storage unit 102 is configured to supply power to the E-TRU 101. In an embodiment, a single energy storage unit 102 may be configured to supply power to both the electric vehicle 106 and the E-TRU 101. Alternatively, the energy storage unit 102 can be separate for the electric vehicle 106 and the E-TRU 101, for example, one energy storage unit 102 for the electric vehicle 106 and another energy storage unit 102 for powering the E-TRU 101.

The axle generator 103, in communication with the energy storage unit 102, is adapted to supply power to at least one of the energy storage unit 102 and the E-TRU 101. The axle generator 103 may be in communication with the energy storage unit 102 and may be adapted to supply power to at least one of the energy storage unit 102 and the E-TRU 101. In one or more embodiments, the energy storage unit 102 may include at least one of a battery, a fuel cell, and a flow battery. The energy storage unit 102 may be configured to receive power from the axle generator 103 during an engaged mode of the axle generator 103. In particular, the energy storage unit 102 may be charged by the axle generator 103 when the electric vehicle 106 is in motion and store energy which is to be selectively supplied to the E-TRU 101. In an embodiment, the energy storage unit 102 may be electrically coupled to a DC/DC boost converter configured to regulate the output voltage of the energy storage unit 102. For instance, the DC/DC boost converter may increase the output voltage of the energy storage unit 102.

The axle generator 103 may be mounted on an axle or a hub of the electric vehicle 106. The axle generator 103 may be configured to recover rotational energy from the axle or the hub when the electric vehicle 106 is in motion. For instance, the axle generator 103 may be configured to recover the rotational energy when the axle of the electric vehicle 106 is rotating due to acceleration, de-acceleration, coasting, or braking. Further, the axle generator 103 may be configured to convert the recovered rotational energy into electrical energy, herein referred to as the power.

In the illustrated embodiment, the axle generator 103 may be embodied as an Alternate Current (AC) generator configured to convert the rotational energy into the AC power. The axle generator 103 may be asynchronous or synchronous. In such an embodiment, an inverter may be in communication with the axle generator 103 and configured to receive the AC power from the axle generator 103. The inverter may be configured to convert the AC power into the Direct Current (DC) power. In one or more embodiments, the inverter may include, but is not limited to, a voltage control function, a current control function, and a frequency converter. In one or more embodiments, the axle generator 103 may be embodied as a DC generator, without departing from the scope of the disclosure.

The charge management system 104 is in communication with the E-TRU 101, the energy storage unit 102, and the axle generator 103. In one or more embodiments according to the disclosure, the charge management system 104 includes a battery management controller 122 and an E-TRU controller 124 in communication with each other and an electronic drive controller 126 configured to control the axle generator 103. The charge management system 104 or more particularly, the battery management controller 122, is configured to monitor a State of Charge (SoC) of the energy storage unit 102.

Next, the charge management system 104 accesses route information associated with the electric vehicle 106. The route information includes at least one of information retrieved from a Geographical Information System (GIS), information associated with driver behavior, and information retrieved from a sensing system 120 associated with the electric vehicle 106. As used herein, GIS information may be retrieved from a database that contains representations of geographic phenomena, modeling their geometry (location and shape), and their properties or attributes. The GIS database may be stored in a variety of forms, such as a collection of separate data files or a single spatially enabled relational database. GIS information uses space-time location as the key index variable for all other information. Just as a relational database containing text or numbers can relate many different tables using common key index variables, GIS can relate otherwise unrelated information by using location as the key index variable. The key is the location and/or extent in space-time.

Any variable that can be located spatially, and increasingly also temporally, can be referenced using a GIS. Locations or extents in Earth space-time may be recorded as dates/times of occurrence, and x, y, and z coordinates representing, longitude, latitude, and elevation, respectively. These GIS coordinates may represent other quantified systems of temporo-spatial reference (for example, highway mile-marker, surveyor benchmark, building address, street intersection, entrance gate, etc.). Units applied to recorded temporal-spatial data can vary widely (even when using the same data, see map projections), but all Earth-based spatial-temporal location and extent references should, ideally, be relatable to one another and ultimately to a “real” physical location or extent in space-time.

Related by accurate spatial information, an incredible variety of real-world and projected past or future data can be analysed, interpreted, and represented. The most common types of phenomena that are represented in GIS data may be divided into two conceptualizations such as discrete objects (e.g., a house, a road, etc.) and continuous fields (e.g., traffic density, rainfall amount, etc.). Traditionally, there are two broad methods used to store data in a GIS system for both kinds of abstractions mapping references: raster images and vector. Points, lines, and polygons represent vector data of mapped location attribute references. A new hybrid method of storing data is that of identifying point clouds, which combine three-dimensional points with RGB information at each point, returning a “3D color image”.

In an embodiment, the route information may be stored in a memory unit 128. For example, the driver of the electric vehicle 106 may select a route from a current location to a destination where the driver wishes to reach. The charge management system 104 may retrieve the route information from the memory unit 128 which is deployed as a part of the charge management system 104 or deployed in a remote server. In an embodiment, the route information includes information regarding the elevation along different sections of the route, the number of turns or hairpin bends, the traffic information, the number of designated stops, etc. In one or more embodiments according to the disclosure, the information associated with driver behaviour is also stored for different driver profiles in the memory unit 128. The information associated with driver behavior may be determined in real time based on input signals from the sensing system 120.

In certain implementations, the reference driver behaviour is learned using instantaneous and/or historical route information retrieved from the memory unit 128 using an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

The sensing system 120 includes a plurality of sensors, such as, but not limited to, temperature sensors configured to detect a temperature within the E-TRU 101, speed sensors configured to detect a speed of the electric vehicle 106, etc. Moreover, the sensing system 120 may include sensors configured to detect vehicle speed, clutch switch, brake switch, cruise control, accelerator pedal position, engine speed and generate input signals that are transmitted to the battery management controller 122. In one or more embodiments according to the disclosure, the information retrieved from the sensing system 120 comprises information associated with detection of at least one of an acceleration condition, a de-acceleration condition, a coasting condition, and a braking condition, and an idling condition of the electric vehicle 106. The sensing system 120 may include, but is not limited to, an accelerometer, a Fleet Management System (FMS), and/or an Electronic Braking System (EBS). In one or more embodiments according to the disclosure, the information associated with driver behaviour is modified based on the information retrieved from the sensing system 120.

In an embodiment, the charge management system 104 receives the route information including, for example, the input signals from the sensing system 120, driver behavior information from the memory unit 128, information associated with the SOC of the energy storage unit 102, and GIS information of the selected route. Then, the charge management system 104 predicts a power requirement of the electric vehicle 106 and/or the E-TRU 101 based on the accessed route information. In certain implementations, the reference power requirement of the electric vehicle 106 and the E-TRU 101 is learned using instantaneous and/or historical route information retrieved from the memory unit 128 using an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Finally, the charge management system 104 controls the axle generator 103 in at least one of the engaged mode and a disengaged mode based on the monitored SoC and the predicted power requirement of the electric vehicle 106 and the E-TRU 101. In one or more embodiments according to the disclosure, controlling the axle generator 103 includes determining whether the monitored SOC of the energy storage unit 102 is greater than a configurable threshold level and controlling the axle generator 103 in the disengaged mode if the monitored SOC is determined to be greater than the configurable threshold level. In the disengaged mode of the axle generator 103, the power requirement of the electric vehicle 106 and the E-TRU 101 are supplied completely by the energy storage unit 102.

As used herein, the term "a configurable threshold level" may refer to a reference SOC level of the energy storage unit 102 such that if the SOC level remains above the configurable threshold level, the axle generator 103 is in the disengaged mode. For example, the configurable SOC level may be set as 30 percent SOC level of the energy storage unit 102. This means when the SOC level of the energy storage unit 102 remains above 30 percent SOC level, the axle generator 103 is in the disengaged mode. Moreover, the reference SOC level of the energy storage unit 102 may be user defined. In certain implementations, the reference SOC level is learned using instantaneous and/or historical route information retrieved from the memory unit 128 using an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Alternatively, controlling the axle generator 103 includes determining whether the monitored SOC equals the configurable threshold level and controlling the axle generator 103 in the engaged mode if the monitored SOC is determined to be equal to the configurable threshold level. For example, the configurable SOC level may be set as 30 percent SOC level of the energy storage unit 102. This means when the SOC level of the energy storage unit 102 is equal to or falls below the set 30 percent SOC level, the axle generator 103 is in the engaged mode. In one or more embodiments according to the disclosure, in the engaged mode, the power requirement of the electric vehicle 106 and the E-TRU 101 are supplied only by the axle generator 103. Moreover, in the engaged mode, the charge management system 104 is further configured to analyze the route information to determine a distance between the current location and the destination of the electric vehicle 106. Next, the charge management system 104 predicts the power generated by the axle generator 103 based on the determined distance and the route information. Finally, the charge management system 104 controls the axle generator 103 to supply power to charge the energy storage unit 102 if the predicted power generated by the axle generator 103 exceeds the power for charging the energy storage unit 102.

In one or more embodiments, the communication between various components, such as the E-TRU 101, the energy storage unit 102, the sensing system 120, the battery management controller 122, the E-TRU controller 124, the electronic drive controller 126, and the memory unit 128 may be embodied as wireless communication, wired communication, or via an in-vehicle network. The in-vehicle network may include, but is not limited to, for example, a controller area network (CAN), a Bluetooth Low Energy (BLE) network, a vehicle area network (VAN), Domestic Digital Bus (D2B), Time-Triggered Protocol (TTP), Flex Ray, IEEE 1394, Carrier Sense Multiple Access With Collision Detection (CSMA/CD) based data communication protocol, Inter-integrated Circuit (I2C), Inter Equipment Bus (IEBus), Society of Automotive Engineers, (SAE) J1708, SAE J1939, International Organization for Standardization (ISO) 11992, ISO 11783, Power-line communication (PLC), Plastic Optic Fiber (POF), Serial Peripheral Interface (SPI) bus, Local Interconnect Network (LIN), etc.

As used herein, the term "the battery management controller 122", "the E-TRU controller 124", and "the electronic drive controller 126" may refer to one or a combination of microprocessors, suitable logic, circuits, audio interfaces, visual interfaces, haptic interfaces, or the like. The control circuitry may include, but are not limited to a microcontroller, a Reduced Instruction Set Computing (RISC) processor, an Application-Specific Integrated Circuit (ASIC) processor, a Complex Instruction Set Computing (CISC) processor, a central processing unit (CPU), a graphics processing unit (GPU), a state machine, and/or other processing units or circuits. In one or more embodiments, the control circuitry may include a processor, memory, modules, and data. The modules and the memory are coupled to the processor. The processor can be a single processing unit or several units, all of which could include multiple computing units. The processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute computer-readable instructions and data stored in the memory.

The term "the battery management controller 122", "the E-TRU controller 124", and "the electronic drive controller 126" may also comprise suitable logic, circuits, interfaces, and/or code that may be configured to execute a set of instructions stored in the memory unit 128. The memory unit 128 may additionally store several types of information related to the electric vehicle 106 or driver behavior, location information, vehicle registration information, historical data related to driver behavior, different driver profiles, etc. In an exemplary implementation of the memory unit 128 according to the present disclosure, the memory unit 128 may include, but are not limited to, Electrically Erasable Programmable Read-only Memory (EEPROM), Random Access Memory (RAM), Read Only Memory (ROM), Hard Disk Drive (HDD), Flash memory, Solid-State Drive (SSD), and/or CPU cache memory. The memory may also include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The modules, amongst other things, include routines, programs, objects, components, data structures, etc., which perform tasks or implement data types. The modules may also be implemented as, signal processor(s), state machine(s), logic circuitries, and/or any other device or component that manipulate signals based on operational instructions. Further, the modules can be implemented in hardware, instructions executed by a processing unit, or by a combination thereof. The processing unit can comprise a computer, a processor, such as the processor, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another aspect of the present disclosure, the modules may be machine-readable instructions (software) which, when executed by a processor/processing unit, perform any of the described functionalities.

Figure 2:
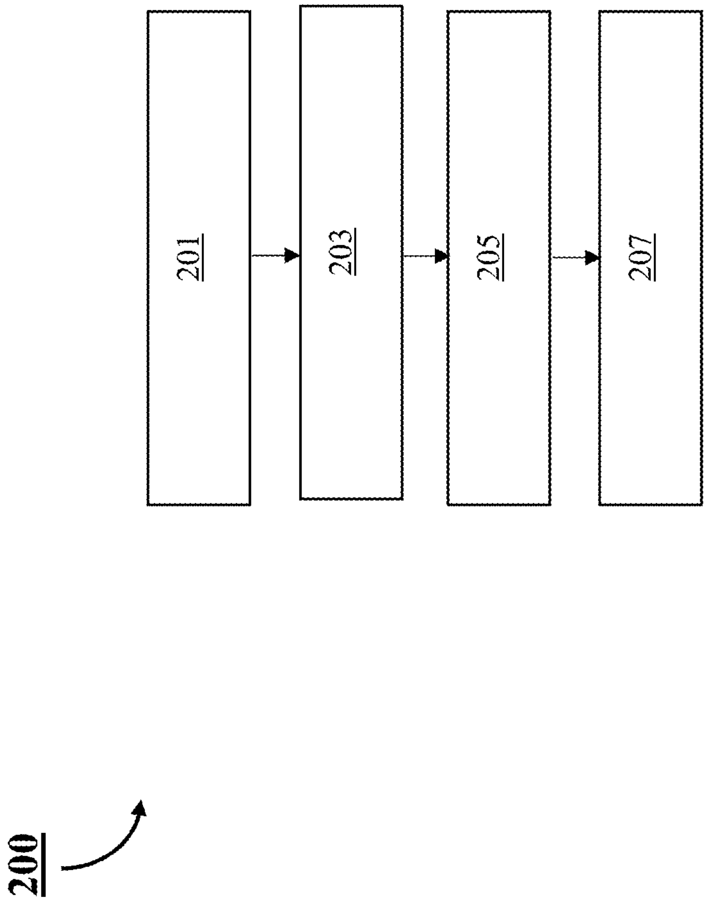
FIG. 2 illustrates a flowchart depicting a method for optimizing power supply to the Electrified Transportation Refrigeration Unit (E-TRU) of the electric vehicle, according to one or more embodiments of the disclosure.

FIG. 2 illustrates a flowchart depicting a method 200 for optimizing power supply to the Electrified Transportation Refrigeration Unit (E-TRU) 101 of the electric vehicle 106.

According to one or more embodiments of the disclosure, at Step 201, the charge management system 104 monitors the State of Charge (SoC) of the energy storage unit 102.

At Step 203, the method 200 includes accessing, via the charge management system 104, route information associated with the electric vehicle 106, the route information comprising at least one of information retrieved from a Geographical Information System (GIS), information associated with driver behavior, and information retrieved from the sensing system 120 associated with the electric vehicle 106.

At Step 205, the method 200 includes predicting, via the charge management system 104, a power requirement of at least the E-TRU 101 based on the accessed route information.

Finally, at Step 207, the method 200 includes the step of controlling, via the charge management system 104, the axle generator 103 in at least one of the engaged mode and the disengaged mode based on the monitored SoC and the predicted power requirement of at least the E-TRU 101.

While the above steps of FIG. 2 are shown and described in a particular sequence, the steps may occur in variations to the sequence in accordance with various embodiments of the disclosure. Further, the details related to various steps of FIG. 2, which are already covered in the description related to FIGS. 1A-1B are not discussed again in detail here for the sake of brevity. As would be gathered, the disclosure offers the power system 100 and the method 300 for for optimizing power supply to the Electrified Transportation Refrigeration Unit (E-TRU) 101 of the electric vehicle 106. Advantageously, the power system 100 and method 200 according to the present disclosure provide an improved energy management by leveraging the GIS information, information from the sensing system 120, and driver behaviour information to improve the utilization of the energy storage unit 102 thereby increasing the efficiency of the E-TRU 101, optimizing energy consumption, and increasing life of the overall system. Optimal consumption of the energy storage unit 102 and the axle generator 103 is achieved which increases the efficiency of the E-TRU 101. Therefore, the power system 100 and method 200 disclosed herein, help in optimizing energy, improving reliability, and increasing efficiency throughout the refrigerated transport sector.

While specific language has been used to describe the subject matter, any limitations arising on account thereto, are not intended. As would be apparent to a person in the art, various working modifications may be made to the method in order to implement the inventive concept as taught herein. The drawings and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment.

We claim:

1. A power system for optimizing power supply to an Electrified Transportation Refrigeration Unit (E-TRU) of an electric vehicle, the power system comprising:
- an energy storage unit configured to supply power to the E-TRU;
- an axle generator in communication with the energy storage unit and adapted to supply power to at least one of the energy storage unit and the E-TRU;
- a charge management system in communication with the E-TRU, the energy storage unit, and the axle generator, the charge management system configured to:
  - monitor a State of Charge (SoC) of the energy storage unit;
  - access route information associated with the electric vehicle, the route information comprising at least one of information retrieved from a Geographical Information System (GIS), information associated with driver behavior, and information retrieved from a sensing system associated with the electric vehicle;
  - predict a power requirement of at least the E-TRU based on the accessed route information;
  - control the axle generator in at least one of an engaged mode and a disengaged mode based on the monitored SoC and the predicted power requirement of at least the E-TRU
  - wherein in the engaged mode, the charge management system is configured to:
  - determine a distance between a current location and a destination of the electric vehicle:
  - predict the power generated by the axle generator based on the determined distance and the route information; and control the axle generator to supply power to charge the energy storage unit based on the predicted power generated.

2. The power system according to claim 1, wherein controlling the axle generator comprises:

determining whether the monitored SOC is greater than a configurable threshold level; and controlling the axle generator in the disengaged mode if the monitored SOC is determined to be greater than the configurable threshold level.

3. The power system according to claim 1, wherein in the disengaged mode, the power requirement of the electric vehicle and the E-TRU is supplied by the energy storage unit.

4. The power system according to claim 1, wherein controlling the axle generator comprises:

determining whether the monitored SOC equals a configurable threshold level; and controlling the axle generator in the engaged mode if the monitored SOC is determined to be equal to or lower than the configurable threshold level.

5. The power system according to claim 1, wherein in the engaged mode, the power requirement of the electric vehicle and the E-TRU is supplied by the axle generator.

6. The power system according to claim 1, wherein in the engaged mode, the charge management system is further configured to:

control the axle generator to supply power to charge the energy storage unit if the predicted power generated by the axle generator exceeds the power for charging the energy storage unit.

7. The power system according to claim 1, wherein the charge management system comprises a battery management controller and an E-TRU controller in communication with each other and an electronic drive controller configured to control the axle generator.

8. The power system according to claim 1, wherein the information retrieved from the sensing system comprises information associated with detection of at least one of an acceleration condition, a de-acceleration condition, a coasting condition, and a braking condition, and an idling condition of the electric vehicle.

9. The power system according to claim 1, wherein the information associated with driver behavior is stored for different driver profiles in a memory unit.

10. The power system according to claim 1, wherein the information associated with driver behavior is modified based on the information retrieved from the sensing system.

11. A method for optimizing power supply to an Electrified Transportation Refrigeration Unit (E-TRU) of an electric vehicle, the method comprising:

monitoring, via a charge management system, a State of Charge (SoC) of an energy storage unit;

accessing, via the charge management system, route information associated with the electric vehicle, the route information comprising at least one of information retrieved from a Geographical Information System (GIS), information associated with driver behavior, and information retrieved from a sensing system associated with the electric vehicle;

predicting, via the charge management system, a power requirement of at least the E-TRU based on the accessed route information;

controlling, via the charge management system, the axle generator in at least one of an engaged mode and a disengaged mode based on the monitored SoC and the predicted power requirement of at least the E-TRU wherein in the engaged mode, the charge management system is configured to:

determine a distance between a current location and a destination of the electric vehicle:

predict the power generated by the axle generator based on the determined distance and the route information; and control the axle generator to supply power to charge the energy storage unit based on the predicted power generated.

12. The method according to claim 11, wherein controlling the axle generator comprises:

determining whether the monitored SOC is greater than a configurable threshold level; and controlling the axle generator in the disengaged mode if the monitored SOC is determined to be greater than the configurable threshold level.

13. The method according to claim 11, wherein in the disengaged mode, the power requirement of the electric vehicle and the E-TRU is supplied by the energy storage unit.

14. The method according to claim 11, wherein controlling the axle generator comprises:

determining whether the monitored SOC equals a configurable threshold level; and controlling the axle generator in the engaged mode if the monitored SOC is determined to be equal to or lower than the configurable threshold level.

15. The method according to claim 11, wherein in the engaged mode, the power requirement of the electric vehicle and the E-TRU is supplied by the axle generator.

16. The method according to claim 11, wherein in the engaged mode, the charge management system is further configured to:

control the axle generator to supply power to charge the energy storage unit if the predicted power generated by the axle generator exceeds the power for charging the energy storage unit.

17. The method according to claim 11, wherein the charge management system comprises a battery management controller and an E-TRU controller in communication with each other and an electronic drive controller configured to control the axle generator.

18. The method according to claim 11, wherein the information retrieved from the sensing system comprises information associated with detection of at least one of an acceleration condition, a de-acceleration condition, a coasting condition, and a braking condition, and an idling condition of the electric vehicle.

19. The method according to claim 11, wherein the information associated with driver behavior is stored for different driver profiles in a memory unit.

20. The method according to claim 11, wherein the information associated with driver behavior is modified based on the information retrieved from the sensing system.

* * * * *